United States Patent
Martin

(10) Patent No.: US 6,257,768 B1
(45) Date of Patent: Jul. 10, 2001

(54) BEARINGS

(75) Inventor: John William Martin, High Wycombe (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/430,399

(22) Filed: Oct. 29, 1999

(30) Foreign Application Priority Data

Oct. 30, 1998 (GB) .................................................. 9823674

(51) Int. Cl.$^7$ ............................................................ F16C 33/06
(52) U.S. Cl. ............................................. 384/430; 384/288
(58) Field of Search ................................. 384/276, 288, 384/294, 295, 428–434, 906; 74/579 R; 123/195 R

(56) References Cited

U.S. PATENT DOCUMENTS

| 2,821,444 | 1/1958 | Brown | 384/432 |
| 4,025,131 | * 5/1977 | Bergquist et al. | 384/428 |
| 5,072,707 | * 12/1991 | Takai et al. | 384/439 X |
| 5,788,380 | 8/1998 | Niegel et al. | 384/288 |

FOREIGN PATENT DOCUMENTS

| 27 23 585 | 5/1977 | (DE) . |
| 36 19 404 | 6/1986 | (DE) . |
| 195 10 928 | 3/1995 | (DE) . |
| 2 754 023 | 9/1996 | (FR) . |
| 1577562 | 10/1980 | (GB) . |
| 2209566 | 5/1989 | (GB) . |
| 2324838 | 11/1998 | (GB) . |

* cited by examiner

*Primary Examiner*—Thomas R. Hannon
(74) *Attorney, Agent, or Firm*—Rader, Fishman & Grauer PLLC

(57) ABSTRACT

A combination of a bearing and a housing for the bearing in an internal combustion engine as described, the bearing including two substantially semi-circular half-bearing shells comprising a first half-shell bearing having a first wall thickness and a second half-shell bearing having a second wall thickness wherein the first wall thickness is different from the second wall thickness and the first and second half-shells have a substantially common bore diameter when assembled in the housing.

15 Claims, 2 Drawing Sheets

BEARINGS

Figure 1:
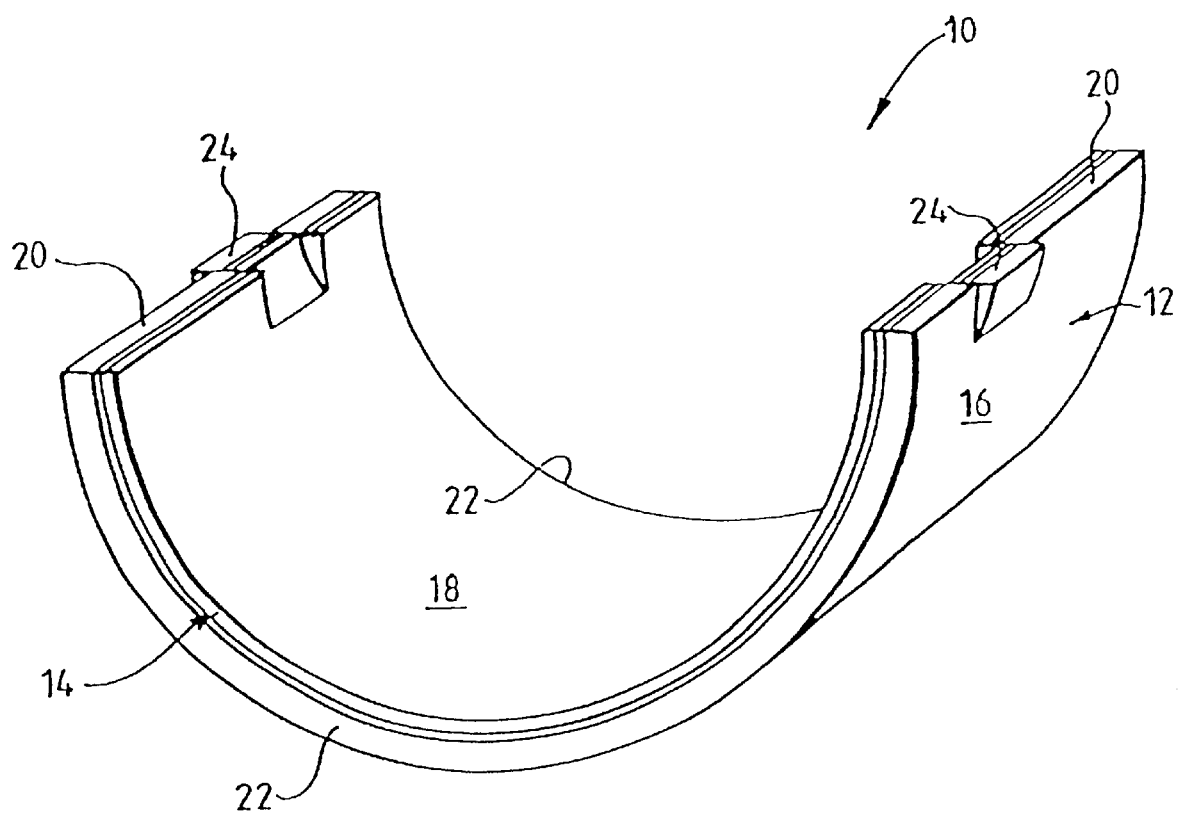

The present invention relates to half-shell bearings for internal combustion engines.

Half-shell sliding bearings generally employ a so-called "nick" or "notch" to provide axial location of the bearing shells in their housings, usually either the connecting rod (conrod) housings and/or the main bearing housings, in the engine. The nick is a small portion of the bearing wall adjacent the joint face and either at one end face or intermediate the bearing end faces which is sheared and moved in a radially outwardly direction relative to the bearing circumference and which locates in a machined recess in the bearing housing. As mentioned above, the purpose of the nick is to provide accurate axial location of the bearing in its housing and, in some cases, to provide a fool-proof assembly method, for example to prevent a cap half-shell being fitted to the block and vice versa where the two half shells differ. The nick is not intended to prevent rotation of the bearing within the housing, rotation being prevented in most cases by the degree of interference between the bearing back and the housing.

However, it is becoming increasingly common for production engines to employ "nickless" bearings.

The absence of a nick presents problems in the case of racing engines. Racing engines operating at high rotational speeds suffer from distortion of the housings due to the high loads generated and in this instance the nick not only provides axial location but also does provide some measure of resistance to circumferential movement of the bearing shells relative to their housing. Racing engine designers are not therefore, prepared to use nickless bearings in racing engines. In some racing applications bearings employing two nicks are used.

Where rotation of the bearing has been experienced, fracture of the nick portion can occur and there is a case for nicks having an increased projected area to resist rotational force to be used, however, for manufacturing reasons this is rarely possible.

There are however disadvantages in having a nick in the bearing and these disadvantages are accentuated in the case of racing engines.

Firstly, the recess in the bearing bore due to the nick can cause breakdown of the hydrodynamic oil film which, in any case, is usually considerably thinner than on normal production engines.

Secondly, the presence of the nick disrupts the the bearing joint face and therefore causes a localised region of poor clamping between the bearing halves with a consequential reduction in contact pressure on the bearing back in this area.

Thirdly, the recess required in the bearing housing to accommodate the nick can act as a stress raiser and cracking in this region between the recess and the bolt hole is not unknown. Again, this particular problem is exacerbated in racing engines due to the greater stresses involved.

Thus, it is an object of the present invention to provide a bearing or a bearing and housing assembly wherein the bearing has greater resistance to rotation relative to its housing whilst not incurring the above mentioned disadvantages of nicks.

According to a first aspect of the present invention, there is provided a combination of a bearing and a housing for said bearing in an internal combustion engine, the bearing including two substantially semi-circular half-bearing shells comprising a first half-shell bearing having a first wall thickness and a second half-shell bearing having a second wall thickness wherein said first wall thickness is different from said second wall thickness and said first and second half shells have a substantially common bore diameter when assembled in said housing.

The "wall thickness" of a bearing is its total thickness including any constituent layers such as steel backing layer and alloy bearing layer for example. The bearing may comprise more than two layers.

The housing of the bearing and housing combination of the present invention may comprise a portion machined into a cylinder block or crankcase part of the engine or alternatively in a conrod (hereinafter referred to as "block") to accept one of the first or second half-shells and a corresponding "cap" part to accept the other half-shell. Since the wall thicknesses of the first and second half-shells are different from each other and the bore diameter is substantially the same it follows that the outer diameters of the first and second half-shells are different and that the block and cap housing parts have corresponding bore diameters to receive the shells.

The axes of the centres of curvature of the bores of the block and cap parts must be coincident.

In the combination of the present invention, part of the joint face of the thicker half-shell butts up against the joint face of the housing of the other half-shell thus preventing rotation of the bearing pair. The bearing half-shells of the present invention do not require nicks and consequently the bearings do not suffer from the disadvantages set out above.

Half bearings in their free state when not clamped together in a housing are slightly longer in circumferential length than their corresponding housing part. This is known as "crush" and is to allow the joint faces of two bearing halves to contact each other and exert a force to push them securely into their respective housings and create an interference fit therebetween. In the thicker of the two half-shells of the present invention, the joint face over the additional diameter compared with the other half shell may be relieved to enable good contact between the bearing half-shell joint faces to permit satisfactory clamping.

According to a second aspect of the present invention, there is provided a bearing comprising a pair of half-bearing shells including a first half-bearing shell and a second half-bearing shell each having a common bore diameter when in use but having different wall thicknesses from each other.

In order that the present invention may be more fully understood, an example will now be describe d by way of illustration only with reference to the accompanying drawings, of which:

FIG. 1 shows a perspective view of a conventional half-bearing shell; and

Figure 2:
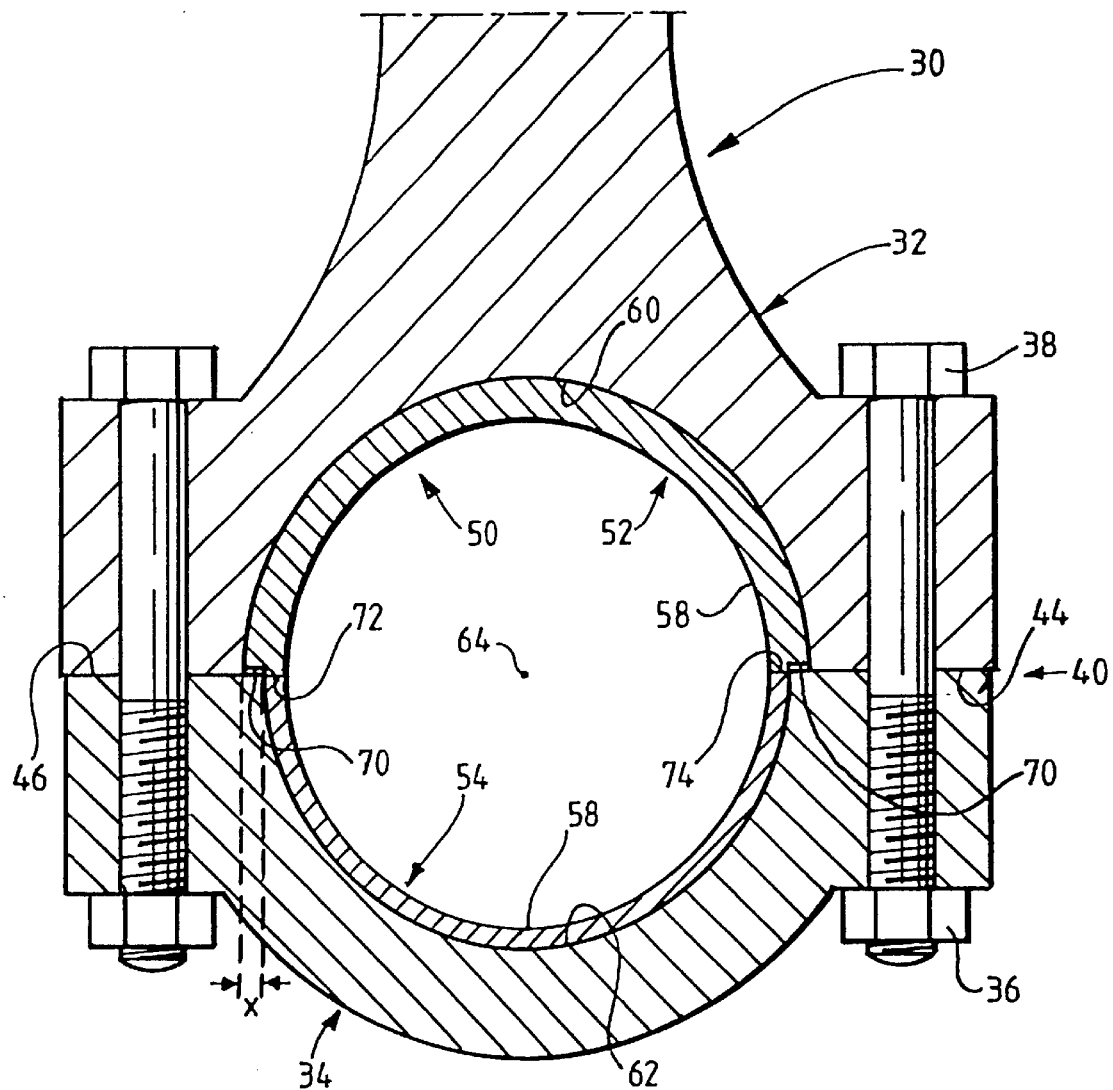

FIG. 2 which shows an end view of a bearing and bearing housing according to the present invention.

Referring now to the drawings and where a conventional half-bearing for an internal combustion engine for example is indicated generally at 10 in FIG. 1. As shown in FIG. 1, the bearing 10 comprises a strong backing 12 from a material such as steel for example and a bearing alloy lining 14 bonded to the backing 12. The bearing back is indicated at 16 and the bore at 18. The joint faces are indicated at 20 and the bearing end faces at 22. A nick 24 is indicated on both joint faces 20 but may only be present on one joint face. The nick is generally pressed from the wall material by shearing in a press tool so as to form a tongue which extends radially outwardly beyond the diameter of the bearing back 16 to locate in a recess (not shown) in a co-operating housing (not shown).

FIG. 2 shows a bearing and bearing housing according to the present invention. The housing comprises a connecting rod 30 having a rod-half 32 and a cap-half 34, the two parts being secured together by nuts 36 and bolts 38 along a common joint line 40 made up of the joint face 44 of the rod-half 32 and the joint face 46 of the cap-half 34. Held within the connecting rod housing 30 is a bearing 50 comprising a first half-bearing shell 52 and a second half-bearing shell 54, the two shells 52, 54 having a common bore 58 when assembled together in the housing 30. The first half shell 52 has wall thickness which is thicker than that of the second half shell 54. Consequently, the bore 60 in the rod-half 32 is greater than the bore 62 in the cap-half 34. However, the axes of both bores 60, 62 are coincident at 64. The portion of the wall thickness indicated at "x" of the first half shell 52 is slightly relieved at the joint faces 70 so as to enable the half shell joint faces 72, 74 to contact each other to permit satisfactory clamping therebetween and to allow a machining tolerance in the housing halves.

It is clear from FIG. 2 that the bearing 50 shown in FIG. 2 cannot rotate relative to the connecting rod housing 30 since the joint face 72 of the half-shell 52 bears against the joint face 46 of the cap-half.

Furthermore there is no nick present to cause oil film disruption or to cause stress raisers in the housing.

The connecting rod 30 of FIG. 2 could be substituted by a housing in an engine cylinder block or crankcase for example.

The relative positions of the two bearing halves 52, 54 may be interchanged such that the thicker half 52 is housed in the cap-half 34 together with corresponding sizing thereof.

Although the present invention has been explained in the context of racing engines, bearings and housings according to the present invention may clearly be employed in many other types of engine.

What is claimed is:

1. A combination suitable for use in an internal combustion engine that includes a bearing and a housing for said bearing, said bearing including two substantially semi-circular half-shells, said first half-shell having a joint face and a first wall thickness and said second half-shell having a joint face and a second wall thickness, wherein said first wall thickness is different from said second wall thickness, and further wherein said first and second half-shells form a substantially common bore when assembled.

2. A combination as recited in claim 1, wherein said housing includes a first-half adapted to receive said first half-shell and a corresponding second-half adapted to receive said second half-shell.

3. A combination as recited in claim 2, wherein at least a portion of said housing is machined.

4. A combination as recited in claim 2, wherein said first-half and said second-half are secured by a connector.

5. A combination as recited in claim 4, wherein said connector includes a nut and a bolt.

6. A combination as recited in claim 2, wherein said first-half includes a first bore and said second-half includes a second bore, and further wherein said first bore and said second bore are of different sizes.

7. A combination as recited in claim 6, wherein said first bore is larger than said second bore.

8. A combination as recited in claim 7, wherein each of said bores have a bore axis, and further wherein said bore axes are substantially coincident.

9. A combination as recited in claim 6, wherein said first-half and second-half include joint faces, and further wherein at least a portion of the joint face of the thicker half-shell contacts at least a portion of the joint face of the housing half adapted to receive the other half-shell when said first half-shell and second half-shell are assembled.

10. A combination as recited in claim 9, wherein at least a portion of said joint face of the thicker half-shell is relieved to facilitate contact between mating portions of said half-shell joint faces.

11. A combination as recited in claim 10, wherein a portion of said joint face of said thicker half-shell contacts a portion of said joint face of said other half-shell to generally prohibit said thicker half-shell from rotating relative to the bore axis of said first-half of said housing.

12. A bearing comprising a mating pair of half-shells, said bearing including a first half-shell having a first thickness and a first bore and a second half-shell having a second thickness and a second bore, wherein said first and second bores have a common diameter, and further wherein said first and second half-shell form a substantially common bore when assembled, and further wherein said first thickness and said second thickness are different.

13. A bearing as recited in claim 12, wherein a portion of said thicker halfshell does not contact said thinner half-shell when said half-shells are assembled to form a substantially common bore.

14. A bearing as recited in claim 13, wherein a portion of said thicker halfshell is relieved to facilitate the assembly of said first and second half-shells.

15. A bearing as recited in claim 14, wherein the thickness of the portion of the thicker half-shell that is relieved is equal to or greater than the thickness of the thinner half-shell.

* * * * *